US008745480B2

(12) United States Patent
Anwar

(10) Patent No.: US 8,745,480 B2
(45) Date of Patent: Jun. 3, 2014

(54) ON-DEMAND HYPERLINK COMPUTER SEARCH TOOL

(76) Inventor: Arman Ali Anwar, Fairfax, VA (US)

( * ) Notice: Subject to any disclaimer, the term of this patent is extended or adjusted under 35 U.S.C. 154(b) by 1100 days.

(21) Appl. No.: 11/858,305

(22) Filed: Sep. 20, 2007

(65) Prior Publication Data

US 2008/0072179 A1 Mar. 20, 2008

Related U.S. Application Data

(60) Provisional application No. 60/826,309, filed on Sep. 20, 2006.

(51) Int. Cl.
*G06F 17/20* (2006.01)
(52) U.S. Cl.
USPC ............... 715/206; 715/200; 715/968
(58) Field of Classification Search
USPC ..................... 715/200, 206, 968
See application file for complete search history.

(56) References Cited

U.S. PATENT DOCUMENTS

| 6,862,710 | B1* | 3/2005 | Marchisio | 715/206 |
|---|---|---|---|---|
| 2002/0091679 | A1* | 7/2002 | Wright | 707/3 |
| 2004/0100510 | A1* | 5/2004 | Milic-Frayling et al. | 345/864 |
| 2004/0133845 | A1* | 7/2004 | Forstall et al. | 715/500 |
| 2005/0209992 | A1* | 9/2005 | Kikinis et al. | 707/1 |
| 2006/0053154 | A1* | 3/2006 | Yano | 707/102 |
| 2007/0233692 | A1* | 10/2007 | Lisa et al. | 707/10 |
| 2008/0022229 | A1* | 1/2008 | Bhumkar et al. | 715/838 |
| 2008/0235594 | A1* | 9/2008 | Bhumkar et al. | 715/738 |
| 2011/0219291 | A1* | 9/2011 | Lisa | 715/207 |

* cited by examiner

*Primary Examiner* — Shen Shiau
(74) *Attorney, Agent, or Firm* — David Grossman

(57) ABSTRACT

An on-demand hyperlink computer search tool implements a method of providing hyperlinked search results that overlay a computer document. The method includes selecting an object in a computer document, submitting the object to a search engine, receiving results, categorizing the results as clusters and displaying the clusters. The clusters are displayed in layers on the same page as the computer document and over the object. Furthermore, an "additional object" may be selected from the clusters. If the selected "additional object" hyperlinks to a specific website, the website is retrieved. If not, the method repeats the process iteratively until "another additional object" that is selected hyperlinks to a specific website.

14 Claims, 12 Drawing Sheets

ON-DEMAND HYPERLINK COMPUTER SEARCH TOOL

CROSS REFERENCE TO RELATED APPLICATIONS

The present application claims the benefit of provisional patent application Ser. No. 60/826,309 to Anwar et al., filed on Sep. 20, 2006, entitled "On-Demand Hyperlink," which is hereby incorporated by reference.

BACKGROUND OF THE INVENTION

When reading or perusing a document on a computer, a user may sometimes come across some term or object the user wishes to acquire more information. These terms may come from a word document, pdf file, text, image, website, etc. For example, the user may want to understand the meaning of "vivacious," find out who is the starting pitcher for "New York Yankees" in a World Series game, or simply look up "San Francisco, Calif. restaurants."

To search results, one may generally input such terms into a search engine in a number of ways. For instance, the user may highlight and cut/copy/paste those terms in a search engine. Alternatively, the user may manually type the terms into the search field. There may also be features where the user may drag and drop the terms or objects into the search field. Even so, the terms and/or objects themselves may allow quick access to another source via hyperlinks. In any event, one skilled in the art would understand that the notion captured here is that current methods of entering search terms and objects in a search engine is timely and ineffective.

However, the process of reverting back and forth from document to document, webpage to document, or webpage to webpage may be monotonous and an inefficient use of time. Thus, as a measure of time management and convenience, what is needed is a search tool that allows for terms to be coupled with hyperlinks that are embeddable in a computer document and accessible on-demand.

DETAILED DESCRIPTION OF THE INVENTION

The claimed invention relates to an on-demand hyperlink computer search tool. In particular, it allows users to search terms or objects on the same computer document without having to open a search engine in a separate window, tab or document. In essence, it provides hyperlinked search results that overlay a computer document.

Effectively, the present invention allows for seamless integration of search capabilities onto one webpage of computer document. As a novel concept, the present invention's search integration provides a set of new user interface paradigms and processes that allow users to search the web or intranet without having to toggle between two or more webpages, computer documents, and/or search engines. Additionally, the information shown from search results can be linked to other information via a powerful search engine infrastructure. Such integration facilities a more natural probing of the "information space."

Figure 1:
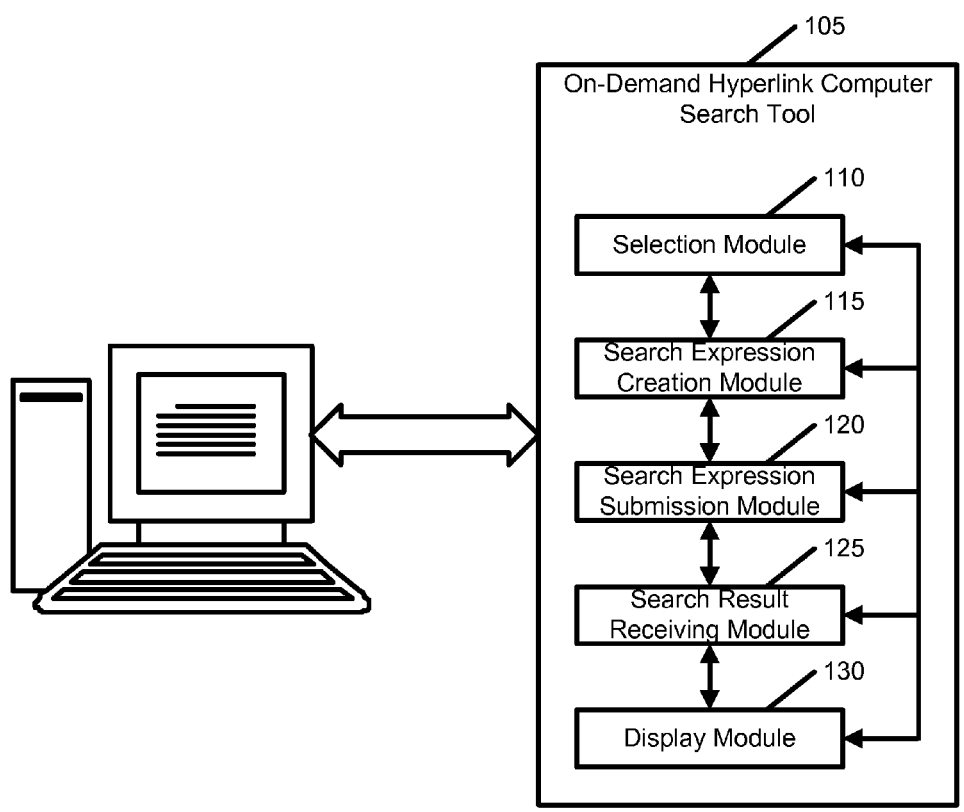
FIG. 1 shows an example of a block diagram of an on-demand hyperlink computer search tool and its association with a computer.
Figure 2:
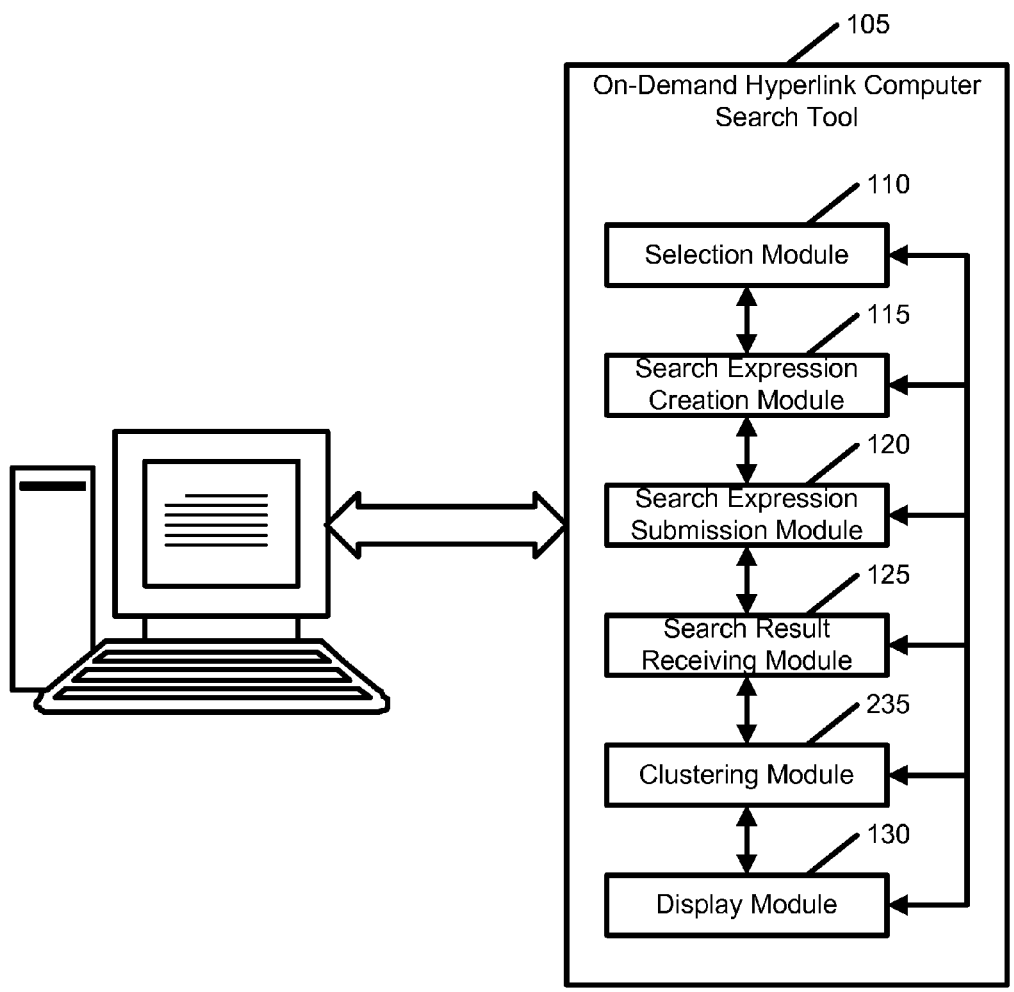
FIG. 2 shows another example of a block diagram of an on-demand hyperlink computer search tool that can be applied using a computer.

As shown in FIG. 1, the on-demand hyperlink computer search tool 105 may comprise a selection module 110, a search expression creation module 115, a search expression submission module 120, a search result receiving module 125 and a display module 130. Furthermore, as exemplified in FIG. 2, the on-demand hyperlink computer search tool may further include a clustering module 235.

The on-demand hyperlink computer search tool 105 is implementable in a computer or tangible computer readable medium. Tangible computer readable medium means any physical object or computer element that can store and/or execute computer instructions. Examples of tangible computer readable medium include, but not limited to, a compact disc (CD), digital versatile disc (DVD), blu-ray disc (BD), usb floppy drive, floppy disk, random access memory (RAM), read-only memory (ROM), erasable programmable read-only memory (EPROM), optical fiber, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

Alternatively, it may be a plugin or part of a software code that can be included in, or downloaded and installed into a computer application. As a plugin, it may be embeddable in any kind of computer document, such as a webpage, word document, pdf file, mp3 file, etc.

The selection module 110 may be configured to select an object residing in a computer document. The search expression creation module 115 may be configured to create a search expression using the selected object. The search expression submission module 120 may be configured to submit the search expression to a search engine. The search result receiving module 125 may be configured to receive search results from the search engine. The display module 130 may be configured to display the search results over the computer document. The clustering module 235 may be configured to filter, analyze and cluster the search results.

Each of these modules may be used to execute the methods of providing hyperlinked search results that overlay a computer document as described herein. Furthermore, each of these modules may be hardware or components that can be implemented in a hardware device. Alternatively, each of these modules may be software elements that can be incorporated individually, in groups, or collectively as a whole within any existing computer application (such as a .doc file, .pdf file, .mp3 file, etc.), search engine, plugin or software.

With the aid of such on-demand hyperlink computer search tool, each of the following exemplified methods and variations thereof may be implemented.

Figure 3:
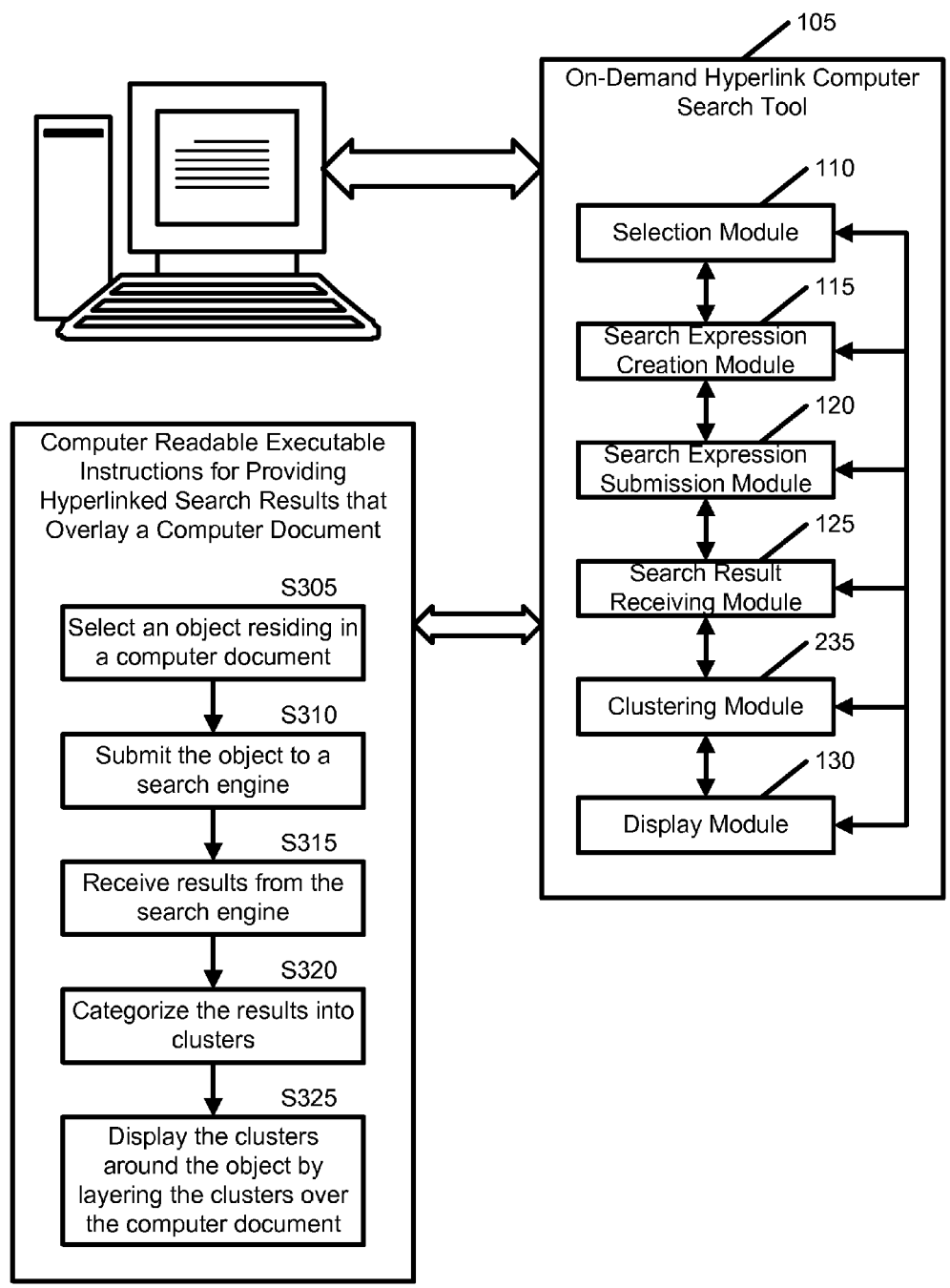
FIG. 3 shows an example of an on-demand hyperlink computer search tool configured to apply computer readable executable instructions for providing hyperlinked search results that overlay a computer document.
Figure 4:
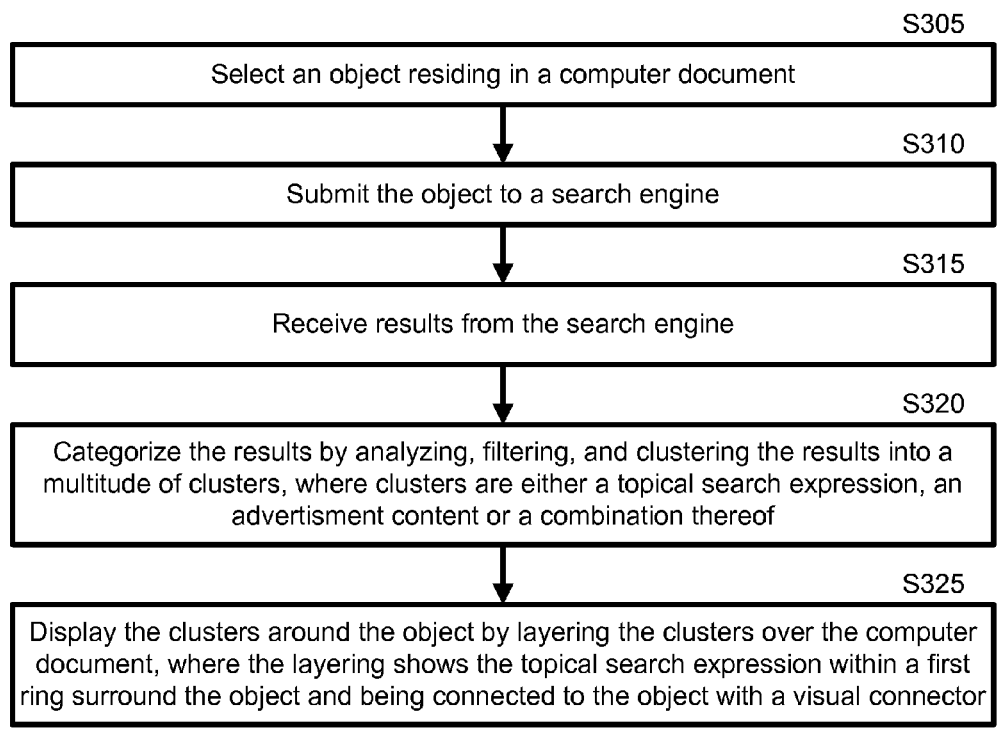
FIG. 4 shows an example of a flow diagram of computer readable executable instructions for providing hyperlinked search results that overlay a computer document.
Figure 5:
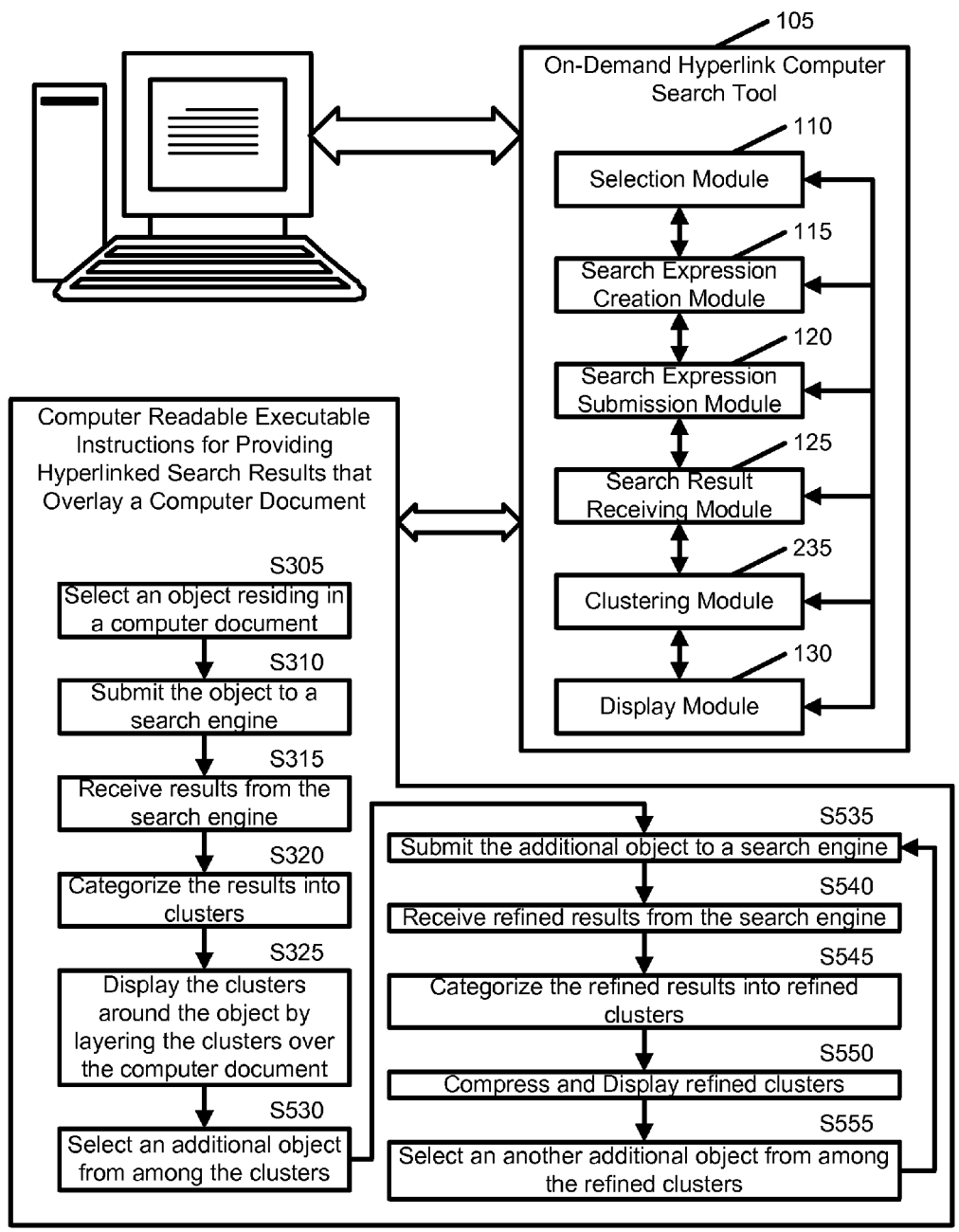
FIG. 5 shows yet another example of an on-demand hyperlink computer search tool configured to apply computer readable executable instructions for providing hyperlinked search results that overlay a computer document.
Figure 6:
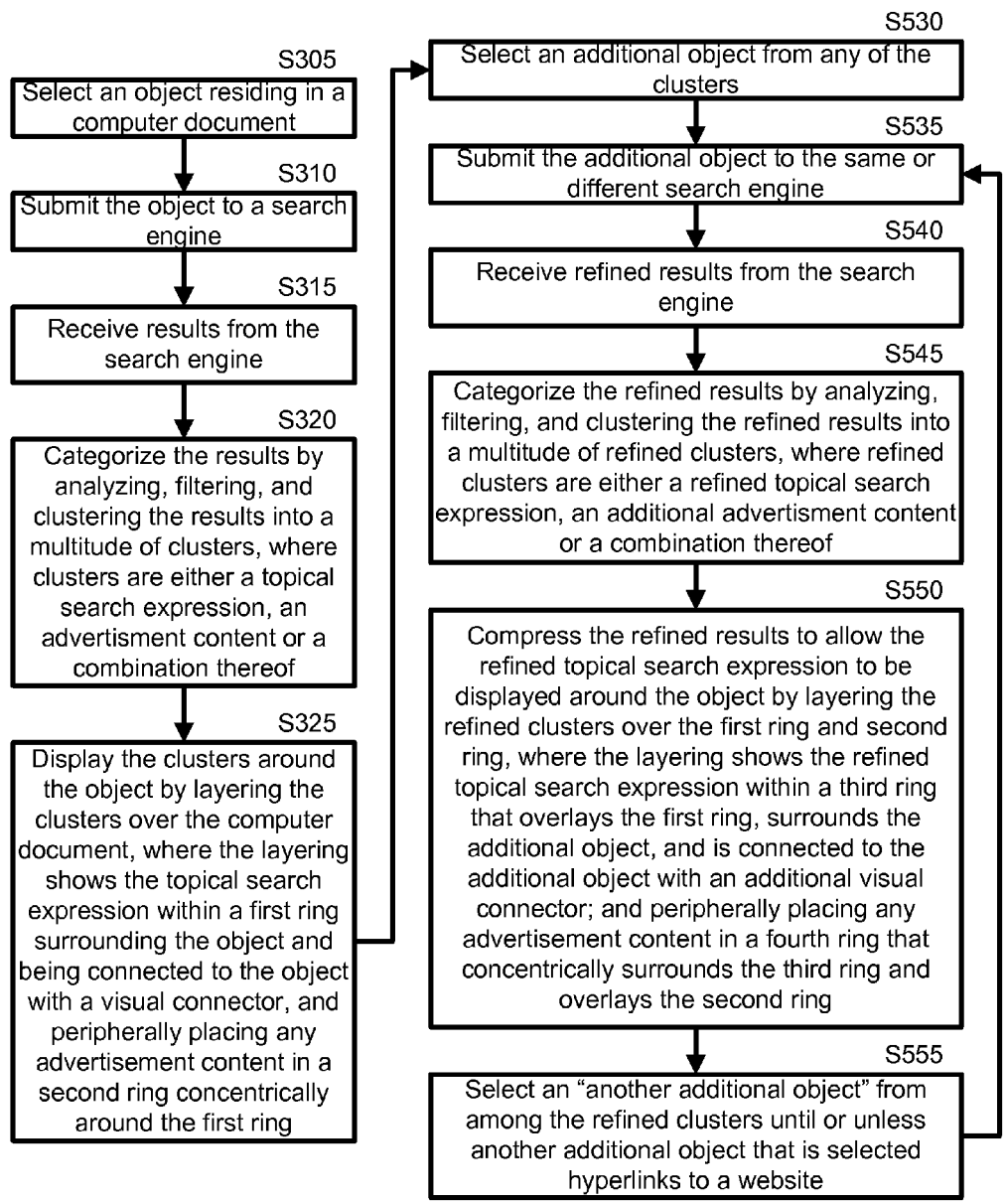
FIG. 6 shows yet another example of a flow diagram of computer readable executable instructions for providing hyperlinked search results that overlay a computer document.

Referring to FIGS. 3, 4, 5 and 6, a method of providing hyperlinked search results that overlay a computer document is shown. More specifically, FIGS. 3 and 5 show varying embodiments on how the method can be implemented in a computer through the use of the on-demand hyperlink computer search tool 105. FIGS. 4 and 6 show varying embodiments of the method itself.

This method is generally a multitude of executable instructions that are embeddable in a tangible computer readable medium. As an embodiment of the present invention, the method may comprise selecting an object residing in a computer document S305; submitting the object to a search engine 310; receiving results from the search engine S315; categorizing the results by analyzing, filtering and clustering the results into a multitude of clusters S320; and displaying the clusters around the object by layering the clusters over the computer document S325.

The executable instructions may be written using any computer language or format. Nonlimiting examples include Ada, Ajax, C++, Cobol, Eiffel, Hypertext Markup Language (HTML), Java, Python, XML, etc.

A computer document means any computer file that contains data inputted by a computer user. The computer file may be generated using one or more computer applications, such as, but not limited to, a word document (any .doc file), a spreadsheet, portable document format (pdf) file, a tag image file format (TIFF) file, joint photographic experts group (JPEG) file, moving picture expert group (MPEG) file, music (e.g., MP3, .wav, etc.) file, a webpage, etc.

As the method generally employs object oriented programming (OOP), the computer file may be written using any computer language that supports OOP. For instance, from among a nonexhaustive list, such computer language may be Ada, Basic, C++, ColdFusion, Eiffel, Fortran, Hypertext Markup Language (HTML), Java, Lisp, Pascal, Perl, PHP, Python, Ruby, VB.net, XHTML, XML, etc.

An object is defined as any data element that can be hyperlinked to a search engine and appears on the computer document. The object may be, for example, a word, an image, etc. Additionally, the object itself may comprise of a multitude of objects that combines words and/or images. Furthermore, the object may be a combination of the above.

It should be noted that the term "object" here does not refer to the general meaning of "object" as well-known in OOP. In other words, "object" does not refer to an individual run-time unit that can be used as a basic building block for a multitude of programs. Quite the contrary, the term "object" here is designated as a possible search term(s) or image(s) that includes a hyperlink that allows a user to select and submit the term(s) or image(s) to a search engine.

Prior to submitting an object to a search engine, the object must be selected S305. In another embodiment, the object may be selected using the selection module 110. In yet another embodiment, the object may be selected by highlighting an object via, for example, pointing over the object with a mouse and double-clicking the left button, selecting the object with a cursor or using a voice operated command.

Once an object is selected, a search expression may need to be created, if necessary. To aid in this creation, the search expression creation module 115 may be used. Where it is unnecessary to use such module, the selected object may be submitted directly to a search engine S310.

To submit the selected object, the search expression submission module 120 may be used. Such module may be in the form of a plugin or other computer software element. If it is in the form of a plugin, then the computer document should support plugins. If it does not currently enable the feature of hyperlinking objects, then it may need to incorporate at least one plugin that is capable of hyperlinking the selected object to a search engine. The plugin may be a generic browser plugin that applies a hyperlinking feature to the computer's default web browser. However, such plugin is not to be confused as a generic plugin for bookmarking purposes only. One difference between the plugins used in the present invention and the bookmarking plugins is the ability to submit the selected object to a search engine or other third party web service provider. Alternatively, the browser plugin may be specific to a particular web browser, such as Internet Explorer or Mozilla Firefox. Overall, as one of ordinary skill in the art is likely to be aware, these types of plugins used by the present invention may be currently known.

The search engine is any known information retrieval system that allows users to access information stored on a computer system. An immediate example that comes to mind is a web search engine that allows for searches to be conducted on the World Wide Web. Examples include Google and Yahoo. However, other search engines may also include online dictionaries, databases, enterprise search engines, etc. Whichever search engine is used, the search engine has the capability of accessing and/or searching any database that house any relevant data for a particular selected object.

After the object is selected and submitted, the search engine conducts a search of the selected object. Any of the results generated may come in a variety of formats. For example, they may be hyperlinks, a definition, an image, an annotation or even a combination of the above. After being generated, the results are sent back to the computer document. The search result receiving module 125 may be used to receive these results S315. Upon receipt, the clustering module 235 may analyze, filter, and cluster the search results into appropriate categories S320. Alternatively, another plugin (which may be the same plugin that first sent the object to the search engine) or the same plugin in the computer document may categorize the results.

Yet, it is also within the scope of the present invention that the analyzed and filtered results are not clustered by the clustering module 235. Instead, the analyzed and filtered results may just be simply displayed in one of the ways described herein.

Generally, categorizing involves analyzing, filtering, and clustering the results into a multitude of clusters. Analyzing involves determined what kind of results are being generated. Filtering involves determining whether the results found fall within the scope of the object to be searched and ranking the relevancy of how the results. Clustering involves putting filtered results into a similar class or category.

Each of these three functions is separate functions and can operate independently of each other. But sometimes, all three processes are necessary for categorizing to be effective.

Each of the clusters may consist of one or more of the following hyperlinks: a topical search expression, an advertisement content or a combination thereof.

A topical search expression is a hyperlinking category of results that groups similar web content together. Similarity of web content is based according to one or more dimensions, including, but not limited to, geospatial locations, subject matter, articles, keywords, social networking, venues, events, maps, time, etc. Consider, for example, tourism in Washington, D.C. If the term "Washington, D.C." is selected as the object in a computer document and submitted to a search engine, some results likely to be generated and received is a listing of various monuments, hotels, restaurants and events in Washington, D.C. The monuments alone (i.e., excluding hotels, restaurants and events) may be grouped together a category called "DC monuments." This category is as a topical search expression.

In addition, a subset of the search results for "Washington, D.C." may be grouped together based on their proximity to the location of the user of the computer document. Proximity can be determined based on the user's internet address by currently available services, global position system enabled computer systems or devices, addresses and/or zip codes, etc. Hence, for example, a person who conducts an Internet search on the word "Washington, D.C." from a hot spot at a coffee shop located in Fairfax, Va. may find that the distance to the White House is approximately 22 miles. Moreover, the conducted search may also be annotated with related options, such as transportation.

Advertisement content generally refers to any hyperlink returned based upon a searched object that introduces an advertisement offering a good or service for sale, lease or rent, whether or not at a discount. For instance, assume the object to be search is "pen". When submitted to a search engine, one of the numerous results returned may show an ad for "Buy 3 Pens, Get 1 Free." Such result qualifies as advertisement content.

The advertisement content that may appear is often based on how the user is navigating the hyperlink space. Hence, as the user selects links that are geared towards a particular category, such as travel, advertisement content may include airfares, hotels, car rentals, tours, etc.

Results that are categorized may be visually displayed onto the computer document S325 in a variety of ways. One embodiment of the present invention involves displaying results with the aid of a display module 130.

As another embodiment of the present invention, the clusters may be overlaid and layered on top of the object. As yet another embodiment, rings may be used to show how search results may be layered. Overall, one or more topical search expressions may be placed within a first ring surrounding the object.

For any advertisement content that is present, such content may be placed peripherally in a second ring concentrically around the first ring. However, if there are no advertisements as a result of the search, then the second ring is not expected to be present. No matter which ring is shown, the ring itself may be in the shape of a circle or oval. Where both rings are present, then the rings may be found concentric to each other.

Within the first ring, each topical search expression displayed should allow for some visual stimulus identifying its connection with the object. For example, the topical search expression may be connected to the object with a visual connector. A visual connector is an element that serves to allow the user to see a connection exists between the topical search expression and object. One of ordinary skill in the art can appreciate the notion that numerous elements may symbolize this connection, such as arrows, lines, color references, polygons, icons, images, etc.

However, it should be noted, that rings are not the only form of visually displaying results. Other ways of displaying results include, but are not limited to, tree-structures, charts, graphs, tables, etc.

As another embodiment, the present invention permits the search to be refined. Referring to FIGS. 5 and 6, the method further includes selecting an "additional object" from among the clusters S530. Unlike the object described earlier, the "additional object" takes on another meaning. Here, the "additional object" pertains to any of the currently displayed topical search expression or advertisement content.

From this point, one of two events may happen. If the user selects an "additional object" that can hyperlink to a specific website (for example, the homepage to CNN), then upon such selection the website is retrieved. It is envisioned that upon retrieval, either a new browser is opened or a new tab is opened in an existing web browser.

However, if the user selects an "additional object" that does not hyperlink to a specific website, then the method further includes iteratively: submitting the "additional object" to the search engine S535; receiving refined results in the form of a multitude of hyperlinks from the search engine S540; categorizing the refined results into a multitude of refined clusters by analyzing, filtering, and clustering each of the hyperlinks S545; compressing the refined results to allow the refined topical search expression to be displayed around the object S550; and selecting an "another additional object" from among the refined clusters until or unless the selected "another additional object" hyperlinks to a specific website S555.

At any point in time, the modules within the on-demand hyperlink computer search tool may be used where appropriate to aid in this iterative process. For instance, the selection module 110 can aid in steps S530 and S555. The search expression creation module 115 can aid in creating a search expression for the selected "additional object." The search expression submission module 120 can aid in step S535. The search result receiving module 125 can aid in step 540. The clustering module 235 can aid in step S545. The display module 130 can aid in step S550. As an additional embodiment, it is envisioned that the present invention allows either the clustering module 235 or the display module 130 or both to carry on the process of compression.

This iterative process can occur because the present invention allows for the clusters to include an object related term. Each object related term may be an object tag. Alternatively, each object related term may be a description associated with the object. These object related terms are what allow the search results to be further refined and provide a narrow focus.

The refined results are similar to the results above but are often narrower in scope than the results. Additionally, the refined clusters are similar to the clusters described above; the refined clusters may consist of a refined topical search expression, an "additional advertisement content" or a combination thereof. The refined topical search expression is similar to the topical search expression except that these narrower categories are generated as part of the refined results. Yet, the "additional advertisement content" may be the same as or equivalent to advertisement content.

Compressing the refined results may be accomplished by layering the refined clusters over the first ring and second ring, by showing one or more refined topical search expressions within a third ring (or subsequent rings based on subsequent search and search results) that overlays the first ring, surrounds the "additional object," and is connected to the "additional object" with an "additional visual connector"; and peripherally placing any of the "additional advertisement content" in a fourth ring (or subsequent rings based on subsequent search and search results) that concentrically surrounds the third ring and overlays the second ring. Any ring may partially or entirely overlay another ring.

However, compression within the scope of the present invention should not be confused as a security element. Here, compression does not involve encrypting or decrypting search results. Furthermore, compression does not involve encoding or decoding the search results.

During compression, the selected "additional object" may simply shift over to the position of the object. Such shifting may allow the third ring (or subsequent rings based on subsequent search and search results) to overlap the first ring to avoid a noisy display of results. Noisy display is referred to as overlapping results or rings that may confuse a user as to which ring of results is being shown (e.g., the ring with more refined results, the ring with broader results or the ring with original first set of results).

Each of the rings within the present invention carries user-friendly features. For example, ring may be minimized or maximized, expanded or shrunken, hidden, or closed. Moreover, the rings may vary in background shading to allow for the user to distinguish what results are being shown. From one extreme to the other, shading may thus vary from being transparent to semi-transparent to opaque. For instance, a user may wish to see topical search expressions in the first ring having a sharply defined outer edge but a transparent background. As another example, the user may wish to set the second ring to have an opaque background with no sharply drawn outer boundary. As for other rings, such as the third ring, fourth ring, fifth ring, etc., they too can provide varying shades of transparency to opaqueness.

With respect to the display, the refined results may be connected to the "additional object" with an "additional visual connector." Just as the visual connector, the "additional visual connector" serves as some visual stimulus that connects the refined topical search expression to the "additional object." Examples of such connectors include, but are not limited to, arrows, lines, color references, polygons, icons, images, etc.

Moreover, the displayed results may, just like above, take a non-ring like form. For example, results may be displayed using a display module or be displayed in tree-structures, charts, tables, etc.

The present invention further allows this cycle to be repeated until or unless the user's selected "another additional object" provides a hyperlink to a specific website S555. Alternatively, the present invention allows the user to terminate the search by providing a close feature on each of the rings.

Hence, the present invention may collectively be integrated as a method being executable instructions within a tangible computer readable medium as shown in the following exemplified embodiment. Using a browser plugin, an object residing in a computer document may be selected S305 and submitted to a search engine S310. Upon accessing data from a database, the search engine forwards the results found to the search result receiving module 125. Results received from the search engine S315 may be in the form of a multitude of hyperlinks. By analyzing, filtering, and clustering each of the hyperlinks, the computer document categorizes the results into a multitude of clusters S320. Each of the clusters may be a topical search expression, an advertisement content or a combination thereof. The clusters may be displayed semi-transparently and concentrically around the object by layering the clusters over the computer document S325. The layering should show the topical search expression within a first ring surrounding the object and being connected to the object with a visual connector. The layering should also peripherally place any advertisement content in a second ring concentrically around the first ring. Then, an "additional object" may be selected from among the clusters S530.

If the selected "additional object" hyperlinks the user to a website, then the website is retrieved. Otherwise, the method enters into an iterative search process until or unless "another additional object" that is selected hyperlinks the user to a website. This iterative process may start with submitting the "additional object" to the search engine S535. Once the search engine accesses a database and retrieves refined results, it sends the refined results back to the computer document S540. Each of the received refined results may also be in the form of a multitude of hyperlinks. Using a plugin and/or a clustering module, the refined results can be categorized by analyzing, filtering and clustering each of the hyperlinks S545. The refined clusters may consist of a refined topical search expression, an "additional advertisement content" or a combination thereof. The refined results are then compressed to allow the refined topical search expression to be displayed semi-transparently and concentrically around the object S550. One way to achieve compression is by layering the refined clusters over the first ring and second ring. The layering should display the refined topical search expression within a third ring that completely covers over the first ring, surrounds the "additional object" and is connected to the "additional object" with an "additional visual connector." Also, the layering should peripherally place any "additional advertisement content" in a fourth ring concentrically around the third ring and have the fourth ring completely overlaying the second ring. After this level of display is completed, yet another additional object can be selected from among the refined clusters to see whether a hyperlink takes the user to a website or causes the search cycle to be repeated S555.

At any point in time, the present invention may, during any selection process, allow for the detection of a pointer hovering over an object, "additional object" or "another additional object." If such hovering is detected, the present invention may present several options for the user. For example, one option may be communicating with the user to see whether or not the user would like to conduct a web search. Another option may be providing a bubble listing potential keyword search results. Yet another option may be suggesting that a user conduct a search by showing in a bubble the question "What's this?" or an equivalent question or comment.

Moreover, to further enable the search to continue cyclically, the topical search expression, as well as the refined topical search expression, may be an object tag. Alternatively, either may be a description of the object, "additional object" or "another additional object."

Figure 7:
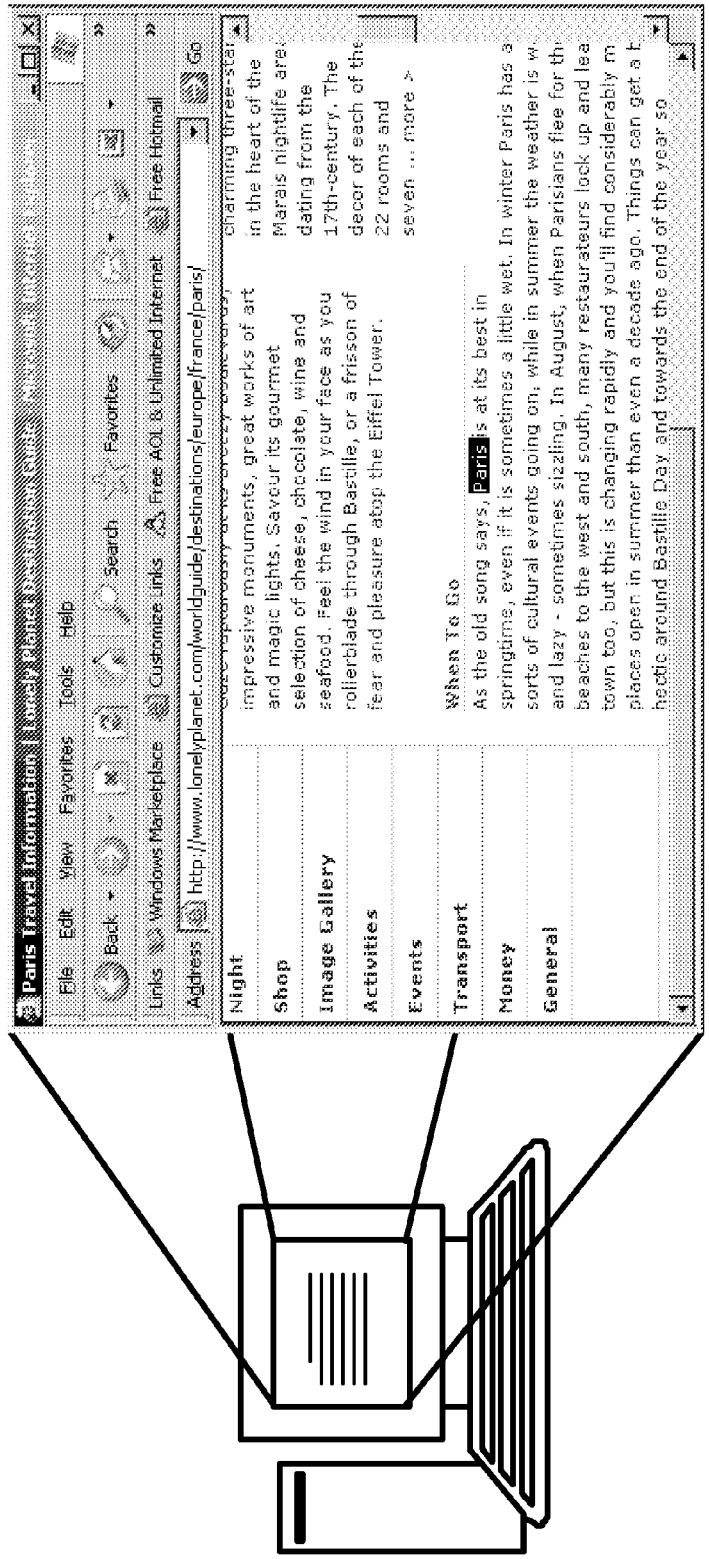
FIG. 7 shows a prior art example of a highlighted object on a webpage.
Figure 8:
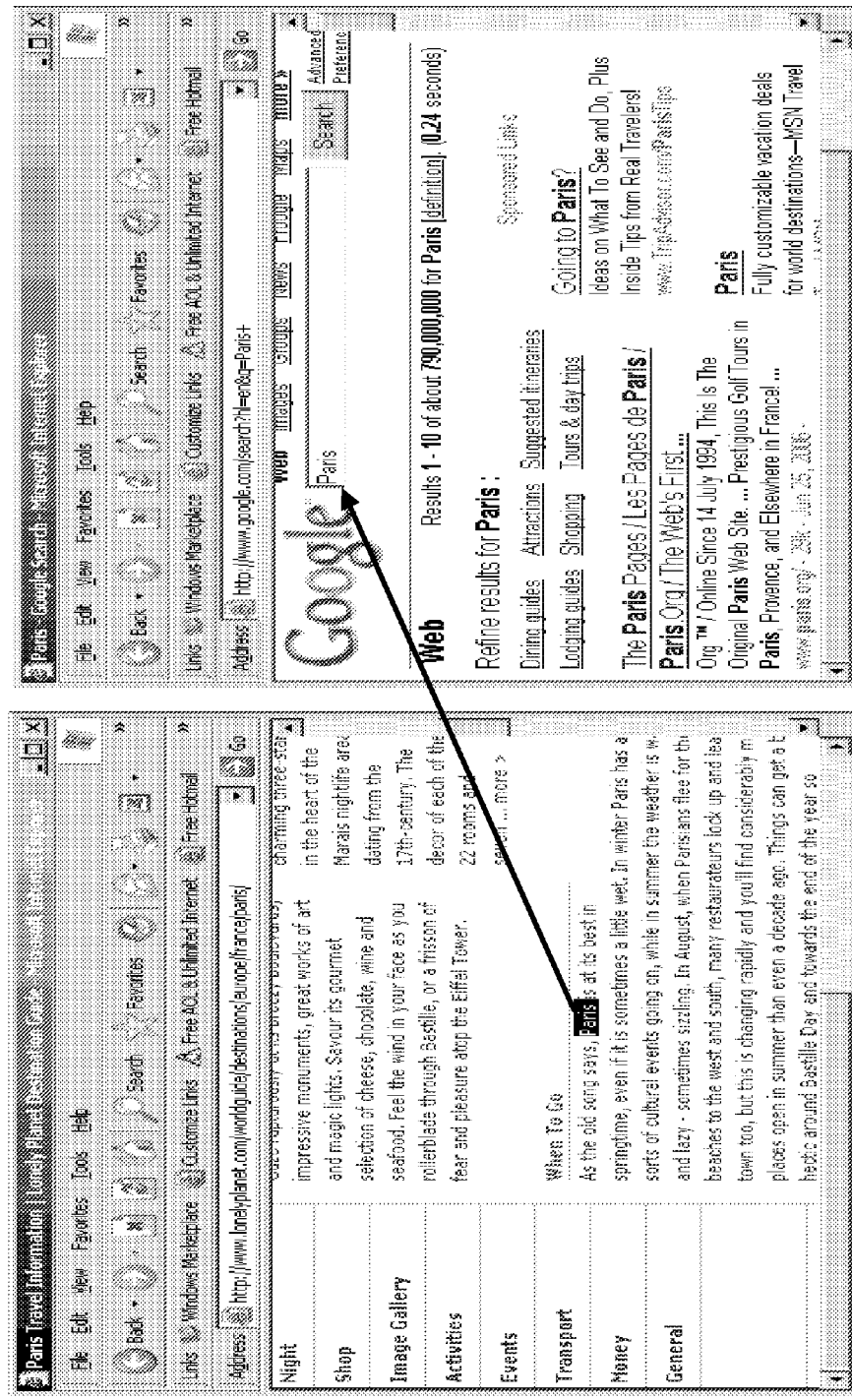
FIG. 8 shows a prior art example of a highlighted object being copied and pasted onto a search engine for conducting a search.

To further exemplify this technique, consider FIGS. 7, 8, 9, 10, 11 and 12. In FIG. 7, the term "Paris" on a webpage may be the highlighted object. The old technique for searching "Paris" entails not only highlighting the term "Paris," but also opening up a web browser, putting such term into a search field, and then allowing the search engine to conduct a search over a multitude of databases to generate search results. This prior art technique is shown in FIG. 8.

Figure 9:
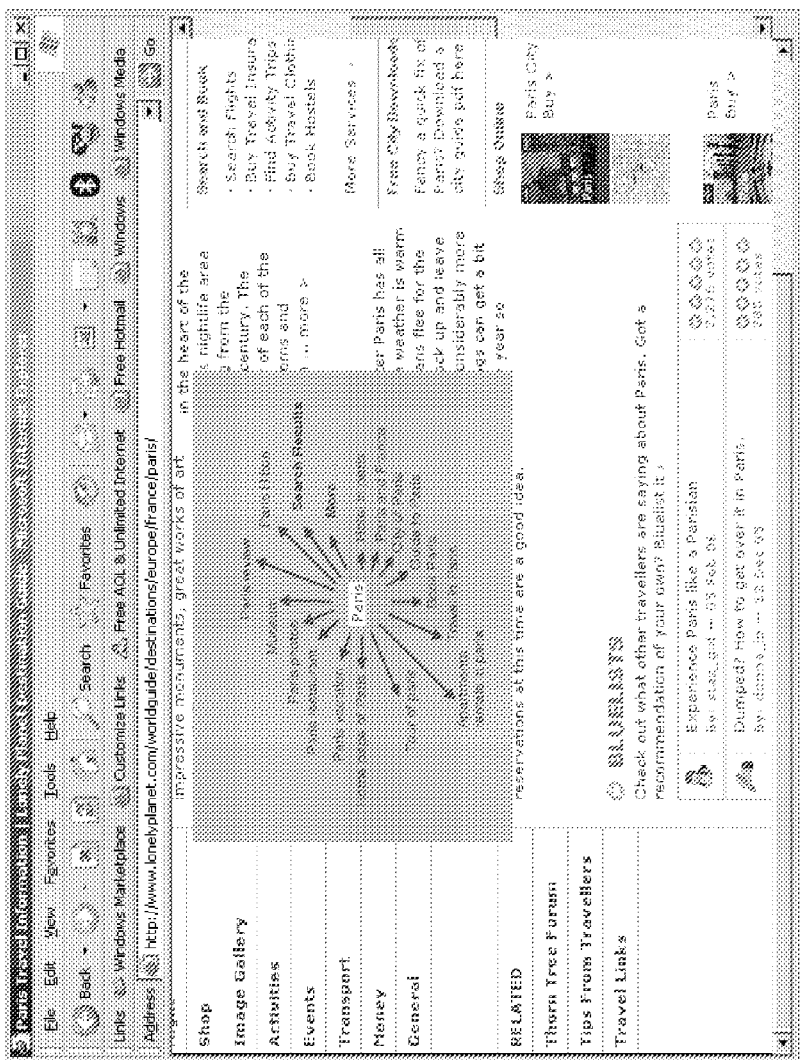
FIG. 9 shows an example of a ring overlaying the webpage and having enclosed topical search expressions that are connected to and surround the highlighted object.
Figure 9:
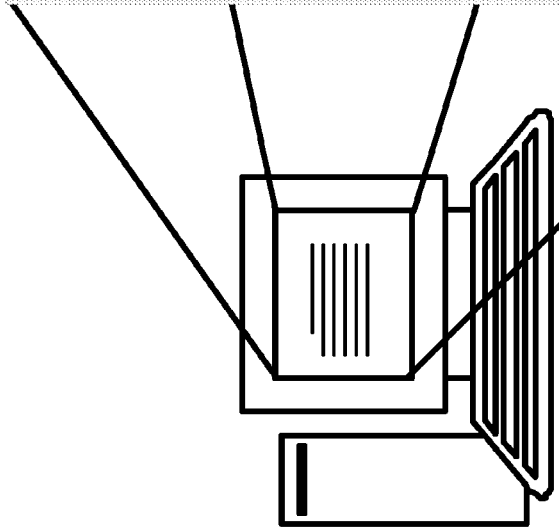
Figure 10:
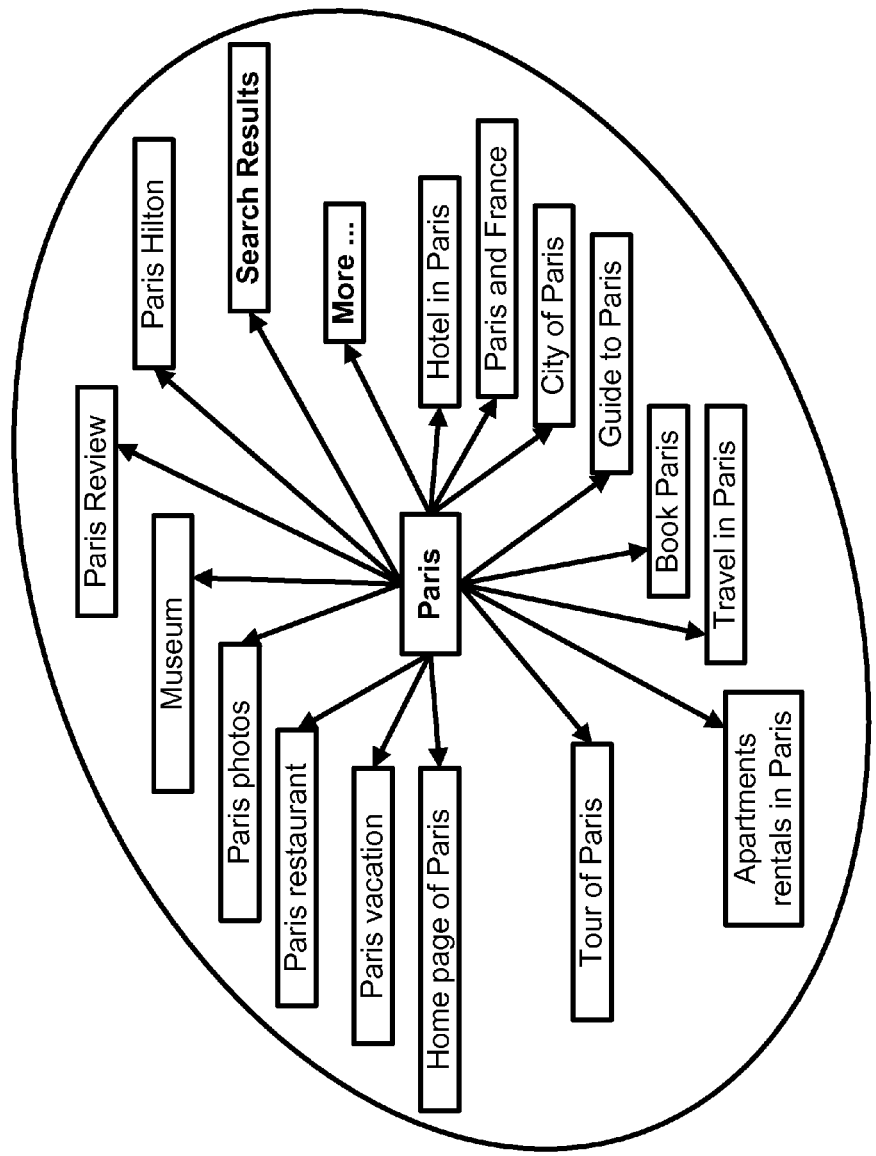
FIG. 10 shows an example of a ring with search results surrounding the highlighted object.

In contrast, the new exemplified technique in this example selects "Paris" as the object, submits it to a search engine (e.g., Google), receives the results in the form of hyperlinks, categorizes the results into clusters and displays the clusters. As illustrated in FIGS. 9 and 10, the clusters may include, for instance, "Hotel in Paris," "Paris and France," "City of Paris," "Guide to Paris," "Book Paris," "Travel in Paris," "Apartments rentals in Paris," "Tour of Paris," "Home page of Paris," "Paris vacation," "Paris restaurant," "Paris photos," "Museum," "Paris review," "Paris Hilton," "Search Results," and "More . . . . " While these displayed results are mere possibilities of what can be generated, they tend to be the top search results grouped into multiple hyperlinks and websites that may interest the user. Both these figures show the categories surrounding the object and enclosed within a ring. The difference is that in FIG. 9, the ring of categories overlay a computer document and is directly over the selected object, whereas in FIG. 10, the ring of categories is isolated for illustrative purposes.

Figure 11:
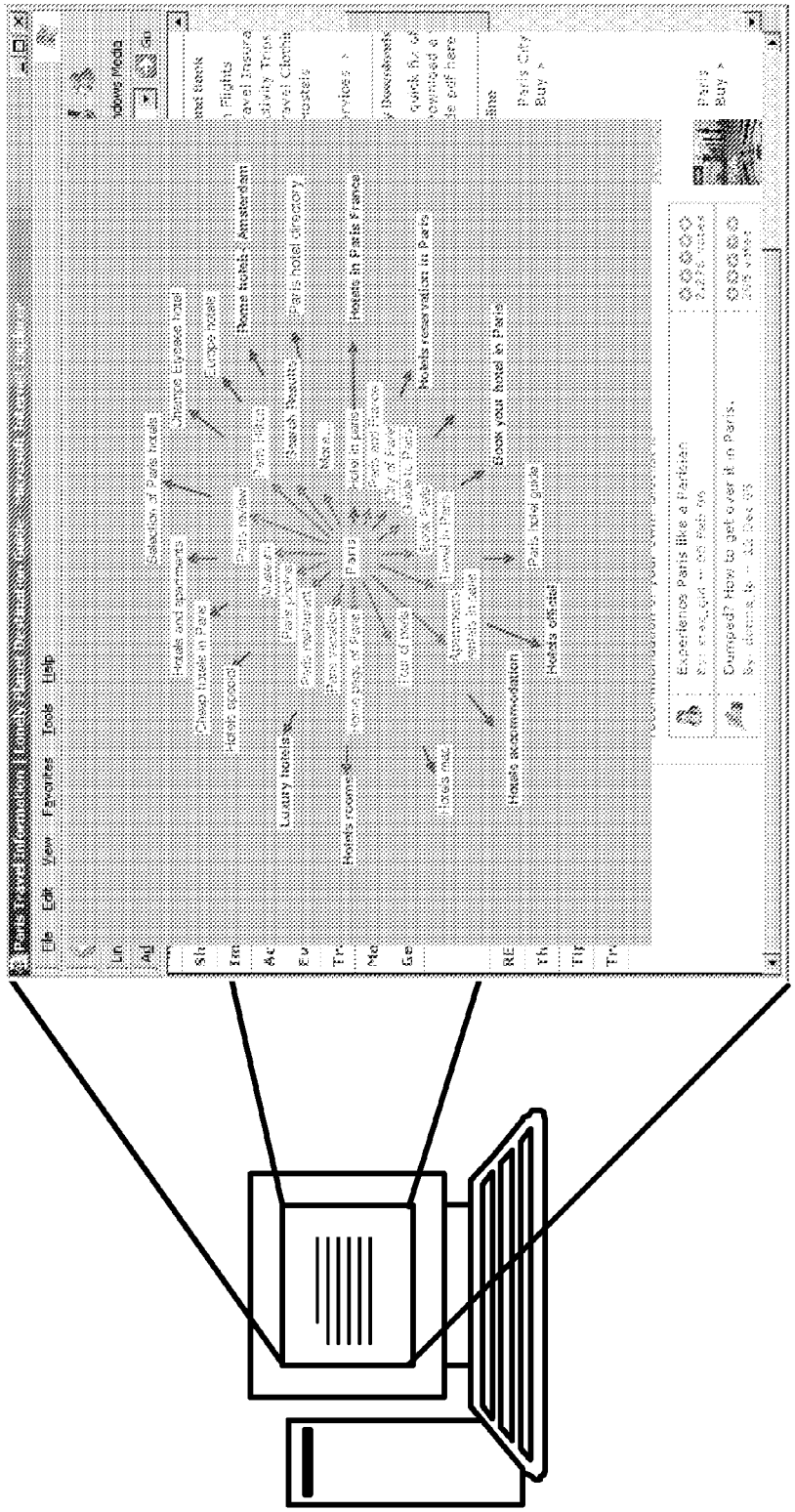
FIG. 11 shows an example of a ring overlaying the webpage and having enclosed topical search expressions that are connected to and surround the highlighted object, and a concentric second ring showing narrowed search results based on a selected topical search expression in the inner ring.
Figure 12:
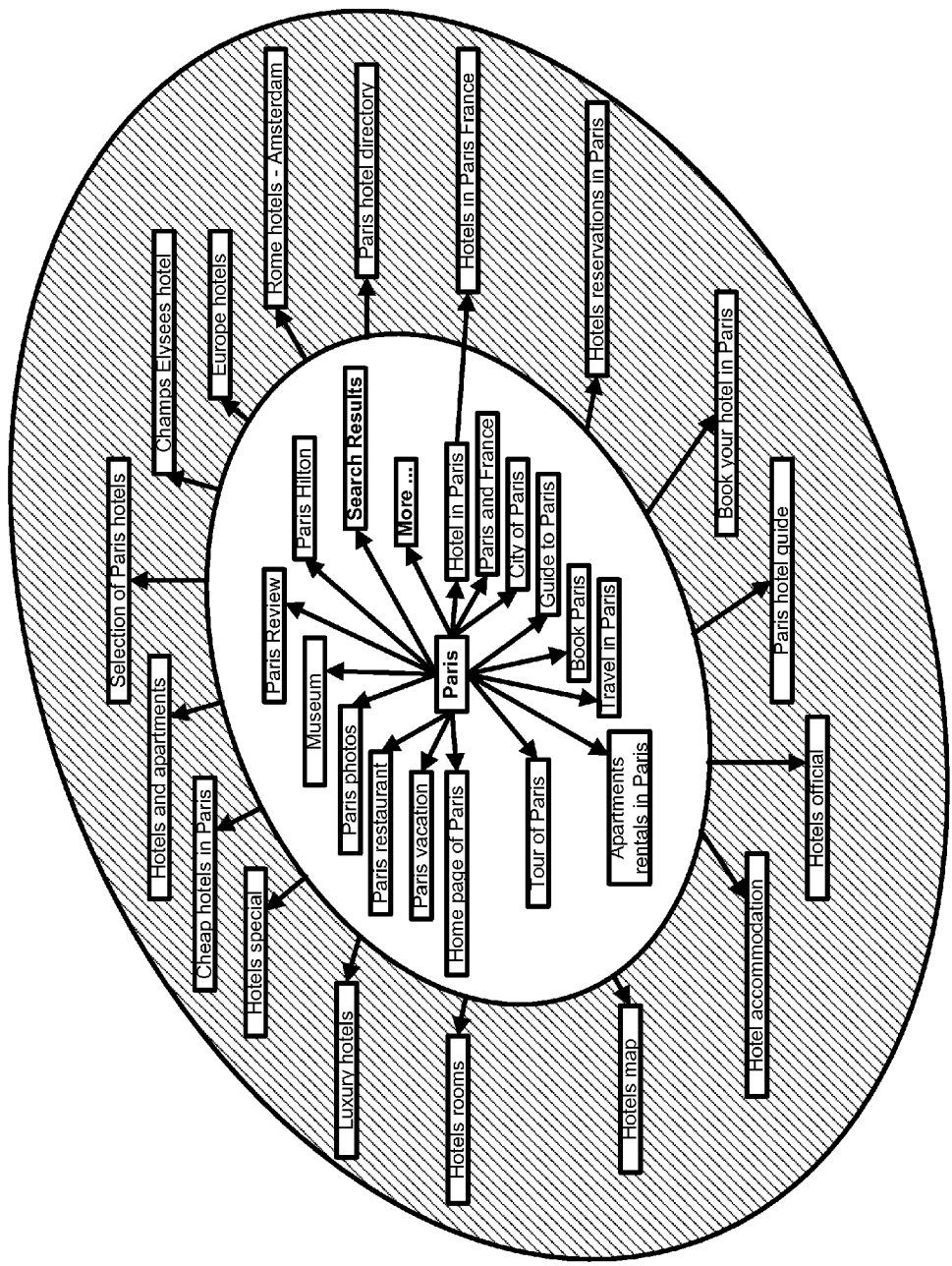
FIG. 12 shows an example of a ring with search results surround the highlighted object, and a concentric second ring showing narrowed search results based on a selected topical search expression in the inner ring.

Suppose in this example, the category "Hotel in Paris" is selected. Once selected, the selected category may undergo the same searching: submission, reception, categorizing and illustration. A multitude of search results should be generated. For instance, the following results may appear: "Hotels in Paris France," "Hotel reservation in Paris," "Book your hotel in Paris," "Paris hotel guide," "Hotels official," "Hotels accommodation," "Hotels map," "Hotels rooms," "Luxury hotels," "Hotels special," "Cheap hotels in Paris," "Hotels and apartments," "Selection of Paris hotels," "Champs Elysees hotel," "Europe hotels," "Rome hotels—Amsterdam," and Paris hotel directory." As shown in FIGS. 11 and 12, these search results can be displayed in a second ring that layers over the object and surrounds the first ring. While FIG. 11 further shows the rings are layered over the computer document, FIG. 12 shows the various shading possibilities of the rings. In this example, the first ring (inner ring) is transparent, whereas the second ring (outer ring) is semi-transparent. The purpose of such contrast variation is to show the levels of search results (i.e., going from broad results to narrower results).

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments.

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. § 112, paragraph 6. Claims that do not expressly include the phrase "means for" or "step for" are not to be interpreted under 35 U.S.C. §112, paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A method of providing hyperlinked search results that overlay a preexisting computer document, said method comprising:
   a. selecting an object residing in said preexisting computer document, the preexisting computer document being a file;
   b. submitting said object to a search engine;
   c. receiving results in the form of a multitude of hyperlinks from said search engine;
   d. categorizing said results into a multitude of clusters by analyzing, filtering, and clustering each of said hyperlinks, said clusters including at least one of the following:
      i. a topical search expression object;
      ii. an advertisement content object; and
      iii. a combination thereof;
   e. displaying said clusters semi-transparently and concentrically around said object by layering said clusters over said preexisting computer document, said layering showing said topical search expression object within a first ring surrounding said object and being connected to said object with a visual connector, and peripherally placing any said advertisement content object in a second ring concentrically around said first ring;
   f. selecting an additional object from among said clusters; and
   g. retrieving a website when the additional object is determined to hyperlink to the website; and when the additional object is determined to not hyperlink to a website, iteratively performing the following until an another additional object that is selected from a refined cluster hyperlinks to a website:
      1. submitting said additional object to said search engine;
      2. receiving refined results in the form of a multitude of said hyperlinks from said search engine;
      3. categorizing said refined results into a multitude of refined clusters by analyzing, filtering, and clustering each of said hyperlinks, said refined clusters including at least one of the following:
         a. a refined topical search expression object;
         b. an additional advertisement content object; and
         c. a combination thereof; and
      4. compressing said refined results to allow said refined topical search expression object to be displayed semi-transparently and concentrically around said object by:

a. layering said refined clusters over said first ring and said second ring, the layering said refined clusters showing said refined topical search expression object within a third ring that overlays the first ring, surrounds said additional object, and is connected to said additional object with an additional visual connector; and b. peripherally placing any said additional advertisement content object in a fourth ring that concentrically surrounds said third ring and overlays said second ring.

2. The method according to claim 1, further including detecting whether a pointer hovers over said object, said additional object or said another additional object during any process of said selecting.

3. The method according to claim 1, wherein said topical search expression obiect is an object tag or a description.

4. The method according to claim 1, wherein said refined topical search expression obiect is an object tag or a description.

5. The method according to claim 1, wherein said preexisting computer document is at least one of the following:
   word document;
   a pdf file;
   an audio file;
   an rap3 file; or
   a combination of the above.

6. A non-transitory computer readable storage medium having program code embodied therewith, the program code executable by a processor to provide hyperlinked search results that overlay a preexisting computer document, said program code configured to:
   a. select an object residing in said preexisting computer document, the preexisting computer document being a file;
   b. submit said object to a search engine;
   c. receive results from said search engine;
   d. categorize said results by analyzing, filtering, and clustering said results into a multitude of clusters, said clusters including at least one of the following:
      i. a topical search expression object;
      ii. an advertisement content object; and
      iii. a combination thereof; and
   e. display said clusters semi-transparently and concentrically around said object by layering said clusters over said preexisting computer document, said layering showing said topical search expression object within a first ring surrounding said object and being connected to said object with a visual connector, and peripherally placing any said advertisement content object in a second ring concentrically around said first ring;
   f. selecting an additional object from among said clusters; and
   g. retrieving a website when the additional object is determined to hyperlink to the website; and when the additional object is determined to not hyperlink to a website, iteratively performing the following until an another additional object that is selected from a refined cluster hyperlinks to a website:
      1. submitting said additional object to said search engine;
      2. receiving refined results in the form of a multitude of said hyperlinks from said search engine;
      3. categorizing said refined results into a multitude of refined clusters by analyzing, filtering, and clustering each of said hyperlinks, said refined clusters including at least one of the following:
         a. a refined topical search expression object;
         b. an additional advertisement content object; and
         c. a combination thereof; and
      4. compressing said refined results to allow said refined topical search expression object to be displayed semi-transparently and concentrically around said obiect by:
         a. layering said refined clusters over said first ring and said second ring, the layering said refined clusters showing said refined topical search expression obiect within a third ring that overlays the first ring, surrounds said additional object, and is connected to said additional obiect with an additional visual connector; and
         b. peripherally placing any said additional advertisement content object in a fourth ring that concentrically surrounds said third ring and overlays said second ring.

7. The medium according to claim 6, wherein said object is at least one of the following:
   a. a word;
   b. an image;
   c. a multitude of objects; and d. a combination thereof.

8. The medium according to claim 6, wherein said clusters include an object related term.

9. The medium according to claim 8, wherein said object related term is an object tag.

10. The medium according to claim 8, wherein said object related term is a description associated with said object.

11. The medium according to claim 6, wherein said results include at least one of the following: a. hyperlinks; b. a definition; c. an image; d. an annotation; and e. a combination thereof.

12. The medium according to claim 6, wherein said search engine accesses a database.

13. The medium according to claim 6, wherein said first ring has a background that is: a. transparent; b. semi-transparent; or c. opaque.

14. The medium according to claim 6, wherein said preexisting computer document is at least one of the following:
   word document;
   a pdf file;
   an audio file;
   an rap3 file; or
   a combination of the above.

* * * * *